United States Patent [19]
Williams

[11] Patent Number: 5,953,742
[45] Date of Patent: *Sep. 14, 1999

[54] MEMORY MANAGEMENT IN FAULT TOLERANT COMPUTER SYSTEMS UTILIZING A FIRST AND SECOND RECORDING MECHANISM AND A REINTEGRATION MECHANISM

[75] Inventor: Emrys John Williams, Eversholt, United Kingdom

[73] Assignee: Sun Microsystems, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/675,265

[22] Filed: Jul. 1, 1996

[51] Int. Cl.[6] .............................. G06F 13/00; G06F 11/00
[52] U.S. Cl. ........................ 711/154; 711/163; 711/167; 395/181; 395/182.03; 395/182.09
[58] Field of Search .............................. 395/575, 182.01, 395/182.03, 182.09, 182.1, 182.13, 182.17, 182.18, 182.11; 711/163, 167, 154

[56] References Cited

U.S. PATENT DOCUMENTS

| | | | |
|---|---|---|---|
| 4,030,074 | 6/1977 | Giorcelli | 395/182.09 |
| 4,375,683 | 3/1983 | Wensley | 395/182.1 |
| 4,757,442 | 7/1988 | Sakata | 395/182.09 |
| 4,905,196 | 2/1990 | Kirrmann | 365/200 |
| 5,193,175 | 3/1993 | Cutts, Jr. et al. | 395/575 |
| 5,226,152 | 7/1993 | Klug et al. | 395/575 |
| 5,269,016 | 12/1993 | Butler et al. | 395/575 |
| 5,276,862 | 1/1994 | McCulley et al. | 395/182.13 |
| 5,295,258 | 3/1994 | Jewett et al. | 395/575 |
| 5,546,536 | 8/1996 | Davis et al. | 395/182.18 |
| 5,553,233 | 9/1996 | Ikeda | 395/182.09 |
| 5,586,247 | 12/1996 | Yoshifuji et al. | 395/182.13 |
| 5,588,113 | 12/1996 | Johnson | 395/182.13 |
| 5,638,508 | 6/1997 | Kanai et al. | 395/182.18 |
| 5,638,509 | 6/1997 | Dunphy et al. | 395/182.18 |
| 5,644,701 | 7/1997 | Takewaki | 395/182.18 |

*Primary Examiner*—Tod R. Swann
*Assistant Examiner*—Tuan V. Thai
*Attorney, Agent, or Firm*—Blakely Sokoloff Taylor & Zafman

[57] ABSTRACT

A memory management system for a fault tolerant computer system. The memory management system includes a first recording mechanism which can be activated to record memory update events; a second recording mechanism which records at least a limited number of memory update events; a fault input for a fault signal to activate the first recording mechanism in the event of a fault event; and a memory reintegration mechanism to reintegrate at least parts of memory identified in the first and second recording mechanisms. Preferably, the recording of memory updates (writes) is not based on recording each address accessed, but rather on memory segments (pages) updated (written to). Further, a fault tolerant computer system includes a plurality of synchronous processing sets, each having a processor with internal memory and operating in lockstep, and an out of sync detector for detecting an out-of-sync-event and for generating an out-of-sync signal.

33 Claims, 5 Drawing Sheets

MEMORY MANAGEMENT IN FAULT TOLERANT COMPUTER SYSTEMS UTILIZING A FIRST AND SECOND RECORDING MECHANISM AND A REINTEGRATION MECHANISM

BACKGROUND AND INTRODUCTION

The invention relates generally to fault tolerant computer systems such as lockstep fault tolerant computers which use multiple subsystems that run identically.

In such lockstep fault tolerant computer systems, the outputs of the subsystems are compared within the computer and, if the outputs differ, some exceptional repair action is taken.

FIG. 1 of the accompanying drawings is a schematic overview of an example of a typical system, in which three identical processing (CPU) sets 10, 11, 12 operate in synchronism (sync) under a common clock 16. By a processing set is meant a subsystem including a processing engine, for example a central processing unit (CPU), and internal state storage. FIG. 2 of the accompanying drawings is a schematic representation of such a processing set. This shows a processing engine 20, internal state storage (memory) 22 and an internal bus 23. The processing set may include other elements of a computer system, but will not normally include input/output interfaces. External connections are also provided, for example a connection 13 from the internal bus 13, an input 15 for the external clock 16 and hardware interrupt inputs 14.

As shown in FIG. 1, the outputs of the three processing sets 10, 11, 12 are supplied to a fault detector unit (voter) 17 to monitor the operation of the processing sets 10, 11, 12. If the processors sets 10, 11, 12 are operating correctly, they produce identical outputs to the voter 17. Accordingly, if the outputs match, the voter 17 passes commands from the processing sets 10, 11, 12 to an input/output (I/O) subsystem 18 for action. If, however, the outputs from the processing sets differ, this indicates that something is amiss, and the voter causes some corrective action to occur before acting upon an I/O operation.

Typically, a corrective action includes the voter supplying a signal via the appropriate line 14 to a processing set showing a fault to cause a "change me" light (not shown) to be illuminated on the faulty processing set. The defective processing set is switched off and an operator then has to replace it with a correctly functioning unit. In the example shown, a defective processing set can normally be easily identified by majority voting because of the two-to-one vote that will occur if one processing set fails or develops a temporary or permanent fault.

However, the invention is not limited to such systems, but is also applicable to systems where extensive diagnostic operations are needed to identify the faulty processing set. The system need not have a single voter, and need not vote merely I/O commands. The invention is generally applicable to synchronous systems with redundant components which run in lockstep.

Lockstep systems depend on total synchronisation of the processing sets that make up the fault tolerant processing core. Accordingly, the processing sets need hardware which operates identically, and, in addition, the internal stored state of the data in the processing sets also needs to be identical. Part of the process of integrating a new processing set into a running system involves copying the contents of the main memory of a running system to the new processing set. Because main memory can be very large, for example of the order of gigabytes, this process can take rather a long time in computing terms.

Lockstep computer systems can go out of sync for various reasons. The prime reason is a failure of a single processing set in a permanent way. Recovery from such a failure normally involves removal of the failed unit, replacement with a functioning unit and reinstatement of the functioning unit. Clearly, the new processing set will have no notion of the contents of memory of a running processing set, and all of the main memory from the running system will have to be copied to the new processing set.

Other, less traumatic out-of-sync events can often be diagnosed automatically by the running computer system and can lead to the automatic reintegration of the out-of-sync processing set without its replacement. For example, a soft data error in a dynamic memory, perhaps caused by a cosmic ray event, could cause a minor upset in operation that could be fixed automatically. However, this has still required the reintegration of the memory state of the out-of-sync processing set, that is the copying of the contents of the main memory from a running system to the out-of-sync processing set. Accordingly, because of the main memory can be very large, this can still take a long time in computing terms.

The invention seeks to provide an automatic and rapid way of recovering from minor out-of-sync events which avoids the problems of the prior art.

SUMMARY OF THE INVENTION

In accordance with one aspect of the invention, there is provided a memory management system for a fault tolerant computer system, the memory management system comprising: a first recording mechanism which can be activated to record memory update events; a second recording mechanism having a capacity to record at least a limited number of memory update events; a fault input for a fault signal to activate the first recording mechanism in the event of a fault event; and a memory reintegration mechanism to reintegrate at least parts of memory identified in the first and second recording mechanisms.

Embodiments of the invention take advantage of the fact that, after a minor out-of-sync event between processing sets in a lockstep system, most of the memory contents of the out-of-sync processing set is initially identical to that in a running system. Only a relatively small number of locations within the memory system of either the out-of-sync processing set or the running system will have been modified. However, the divergence will increase with time as the running system continues to operate and execute its normal processing load. Embodiments of the invention allow for the divergence to be tracked and accounted for and, moreover, for any memory update events around the out-of-sync event and before the first recording mechanism has been activated to be caught.

Preferably, the recording of memory updates (writes) is not based on recording each address accessed, but rather on memory segments (pages) updated (written to). In other words, the first and/or second recording mechanisms preferably record the segments (or pages) updated (written to). This can be done effectively using a segment (or page) memory with a bit per segment (page) for identifying the segments (pages) written to.

In accordance with another aspect of the invention, there is provided a fault tolerant computer system comprising a plurality of synchronous processing sets, each comprising a processor with internal memory and operating in lockstep, and an out of sync detector for detecting an out-of sync-event and for generating an out-of-sync signal, wherein each processing set also comprises: a first recording mechanism which can be activated to record memory write events; a second recording mechanism having a capacity to record at least a limited number of memory write events; a fault input for receiving the out-of-sync signal to activate the first recording mechanism in the event of an out-of-sync event; and a memory reintegration mechanism to reintegrate in an out-of sync processing set at least parts of memory identified in the first and second recording mechanisms.

In accordance with a further aspect of the invention, there is provided a method for reintegration of a processing set of a fault tolerant computer system following a fault, wherein the fault tolerant computer system comprises a plurality of synchronous processing sets, each comprising a processor and internal memory and operating in lockstep, and a fault detector for detecting a fault event and for generating a fault signal, the method comprising:

maintaining a temporary record of memory update events over a limited period;

responding to a fault to activate a further record of memory update events following the fault state; and performing memory reintegration in a processing set in which a fault has occurred for at least those parts of memory identified in the temporary and further memory records.

In an embodiment of the invention a record is kept of at least selected memory access events (memory write events) to main memory after the out-of-sync event, so that only the modified memory locations need to be copied to reintegrate the out-of-sync processing set.

In one embodiment of the invention, the first recording mechanism is a memory management unit comprising a RAM with an entry for each of a plurality of memory pages, a code being written to a page entry each time that page is written to when the first recording mechanism has been activated.

Preferably, the first recording mechanism has an enable input connected to received the fault (out-of-sync) signal.

The first recording mechanism can record an arbitrarily large number of written pages, up to the total number of pages in the processing unit.

The second recording mechanism preferably maintains a rolling record of recent memory update events up to a number sufficient to cover the time to activate the first recording mechanism following a fault event.

The second recording mechanism can comprise a first-in-first out buffer, the first recording mechanism in one embodiment being connected to an output of the first-in-first-out buffer. In this configuration, the first-in-first-out buffer stores up to a predetermined number of update addresses, an address decoder can be connected to the output of the first-in-first-out buffer to generate a page signal representative of a memory update address output from the first-in-first-out buffer and the address decoder is responsive to the out-of sync signal to pass the page signal to the first recording mechanism.

Alternatively, the second recording mechanism can comprise a logic analyzer. This can reduce implementation costs as fault tolerant computers typically include a logic analyzer for fault analysis.

Where the output of the second recording mechanism does not form the input to the first recording mechanism, the operation of the second recording means is preferably inhibited in response to the out-of-sync signal.

The first recording mechanism can comprise a software generated table in which a record corresponding to a page of memory is marked with a code whenever that page has been written. This record can be maintained by software which updates entries in the translation look-aside buffer of the processor. The second recording mechanism can be the contents of the TLB together with a list of pages recently flushed from the TLB.

In response to an out-of-sync input, software can search the TLB and the list for pages which may recently have been written and may mark these as written in the first recording mechanism, then continue to maintain the first recording mechanism until the processing units are reintegrated.

Preferably, the memory reintegration mechanism is operative to reintegrate memory pages identified in the first and second recording mechanisms.

The invention is applicable to a computer system comprising three synchronous processing sets operating in lockstep, wherein an out-of-sync detector determines an out-of-sync processing set by majority voting.

In this case, reintegration of an out-of-step processing set can be achieved by, in response to the identification of an out-of-sync processing set, selecting one of the remaining two processing sets, supplying an interrupt to the out-of-sync processing set and the remaining processing set to cause the out-of-sync and remaining processing sets to idle, reintegrating one of the out-of-sync and remaining processing sets while maintaining a software log of memory write events, and then reintegrating the other of the out-of-sync and remaining processing sets using the software log.

The invention described can reduce the reintegration time of a processing set in a lockstep fault tolerant computer from many minutes to just fractions of a second. During the reintegration period, the computer is vulnerable to a further failure in the running processing set. Thus the reduction in reintegration time has a significant benefit on the overall availability of the computer.

DESCRIPTION OF THE DRAWINGS

An embodiment of the invention will be described hereinafter with reference to the accompanying drawings in which like reference signs relate to like features and in which.

DESCRIPTION OF THE PREFERRED EMBODIMENT

Figure 1:
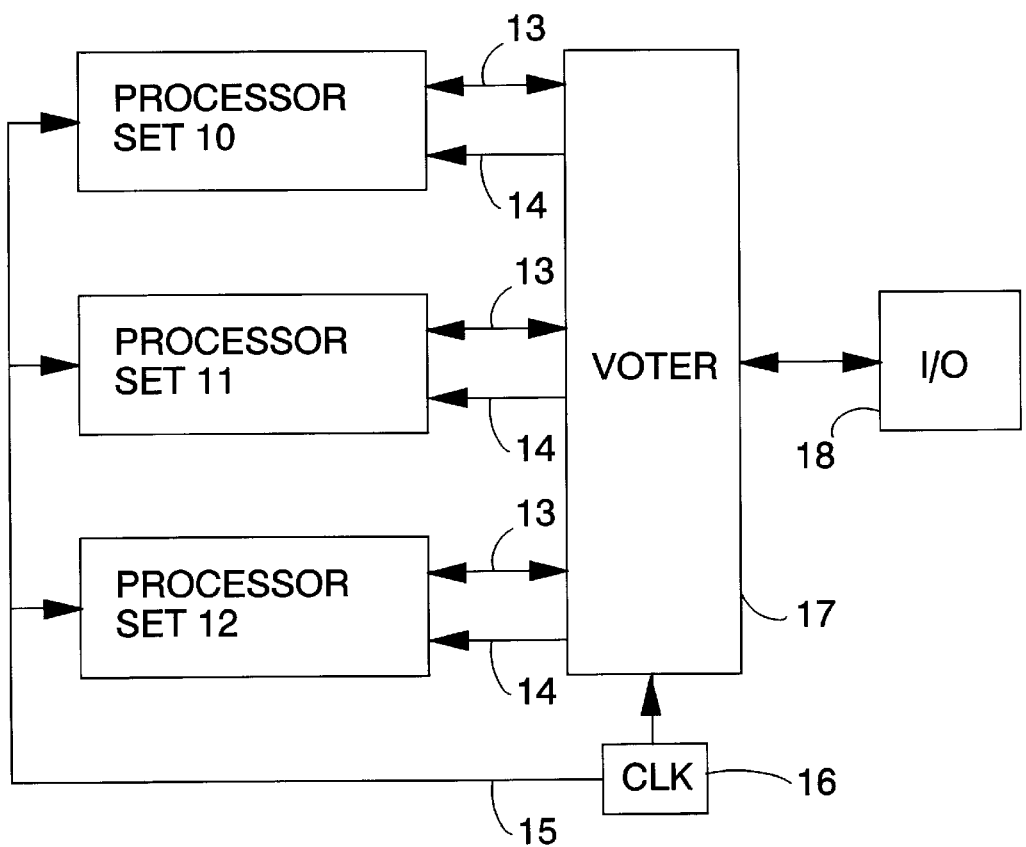
FIG. 1 is a schematic overview of a triple-modular-redundant fault tolerant computer system.
Figure 2:
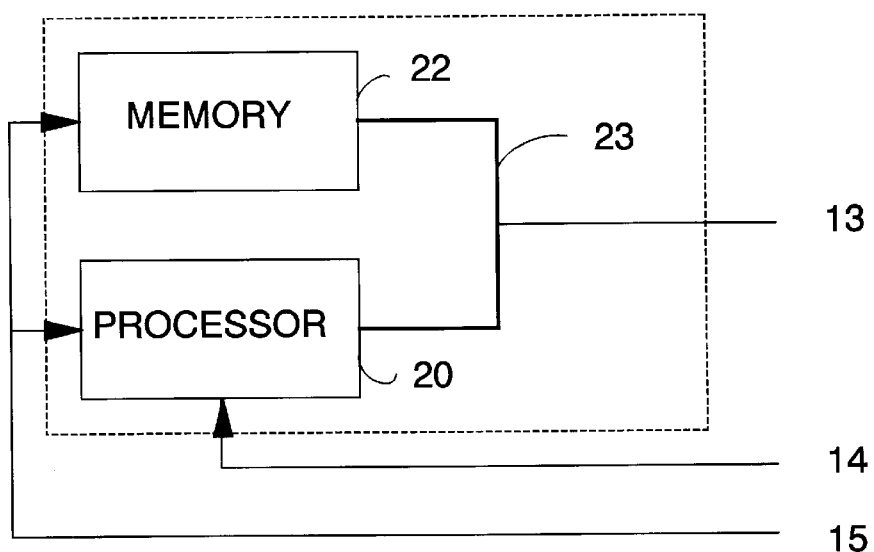
FIG. 2 is a schematic representation of elements of a processor set of the system of FIG. 1.
Figure 3:
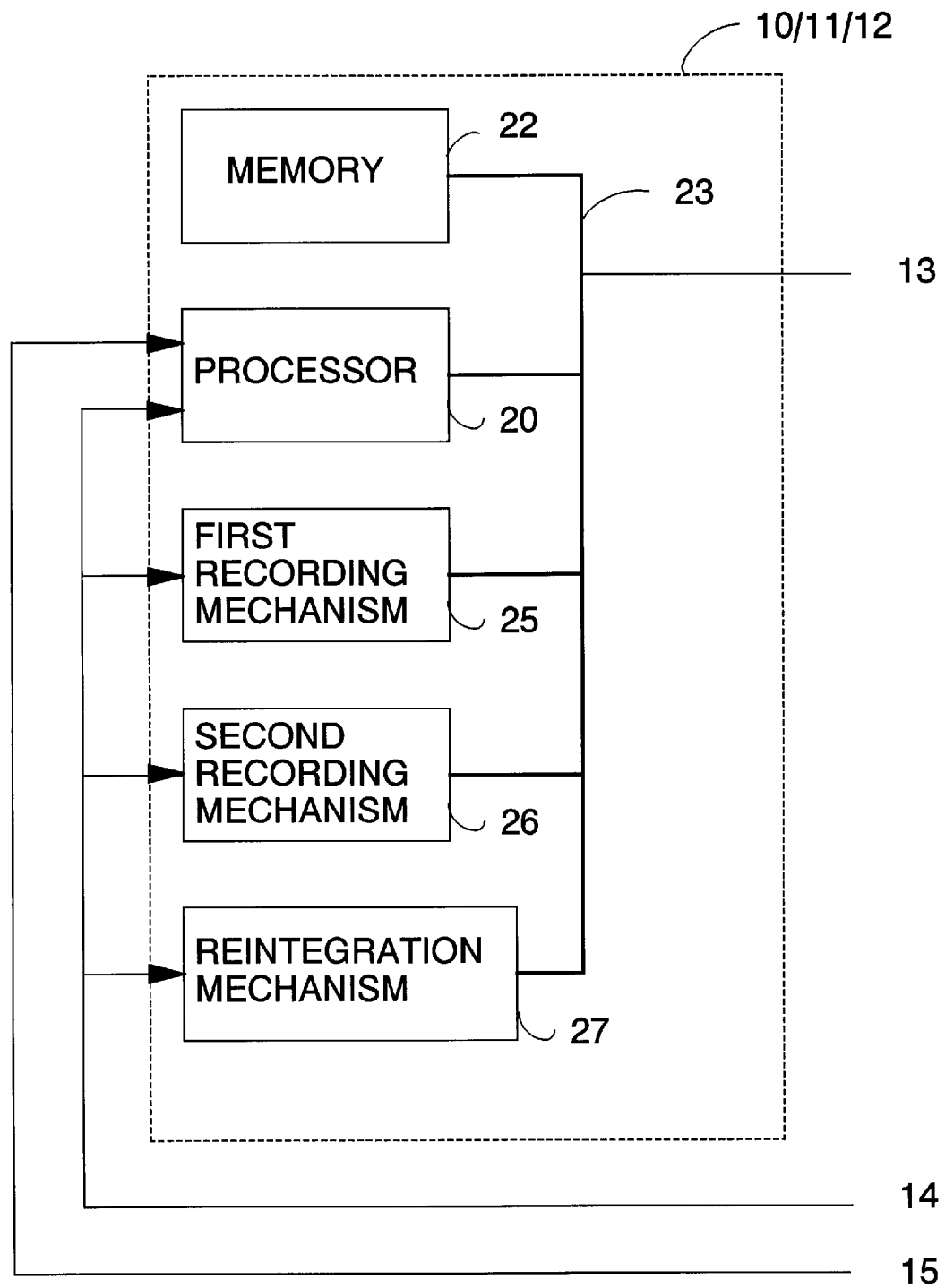
FIG. 3 is a schematic representation of a processor set of an embodiment of the invention.

FIG. 3 is a schematic block diagram to represent elements of an example of the invention in functional terms. FIG. 3 generally represents one of the processing sets 10/11/12 for a fault tolerant computer system such as, for example, the system shown in FIG. 1.

In FIG. 3, a processing engine (e.g, a central processing unit (CPU)) 20 and internal state storage (memory) 22 are connected by an internal bus 23. External connections are also provided, for example a connection 13 from the internal bus 23, an input 15 for an external clock and hardware interrupt input 14.

Also shown schematically in FIG. 3 are a first recording mechanism 25 which can be activated to record memory update events, a second recording mechanism 26 having a capacity to record at least a limited number of memory update events and a memory reintegration mechanism to reintegrate at least parts of memory identified in the first and second recording mechanisms. As shown in FIG. 3, each of the mechanisms 25, 26 and 27 is shown connected to the internal bus 23. This is because the first and second recording mechanisms 25 and 26 need to monitor memory access events to identify when and where memory updating occurs (memory writes). Also the reintegration mechanism 27 needs to access the first and second recording mechanisms to determine where memory writes have occurred in the memories of out-of-sync and running processing sets and then to copy corresponding memory portions from the running to out-of-sync processor set memories. However, the mechanisms 25, 26 and 27 can be implemented in various ways as will be explained in the following description. Various implementations involve different combinations of hardware and software and interconnection of the various elements will typically differ from that illustrated in FIG. 3. For example, the reintegration mechanism will typically be implemented in software, and may be implemented in a control computer associated with and/or forming part of the voter 17. Also, the first recording mechanism 25 may not be connected directly to the bus 23, but may be connected via the second recording mechanism 26. Also the first and second recording mechanisms may be implemented to a greater or lesser extent in software, as will be described hereinafter.

Computer systems typically include memory management hardware to keep track of and control the use of main memory. It is also usual to divide memory into pages of specified size and to keep a small record of access controls to each page. Hardware mechanisms also exist for updating a record for a page with a bit that indicates that the page has been modified. This bit is the so-called 'dirty' bit for a page. A page of memory is called 'clean' when no writes have been made to it to change it from its initial state, and 'dirty' after such a write has been made. Software can cause a page to be marked 'clean' by clearing the dirty bit for that page in the memory management unit record. Hardware will later set the bit to 1 to indicate that the page has been written to. In normal operation, many pages of computer memory will be considered by the memory management unit to be dirty most of the time. Accordingly, if a conventional memory management unit operating in a conventional manner is provided in each of the processing sets of a lockstep fault tolerant computer system, it is thus likely that many pages will be marked dirty when an out-of-sync event occurs.

Because the memory management unit of a conventionally configured computer processing set is usually under the control of the running operating system, in a first embodiment of the invention an additional memory management unit is provided purely for the use of the software which reintegrates processing sets after an out-of-sync event.

Figure 4:
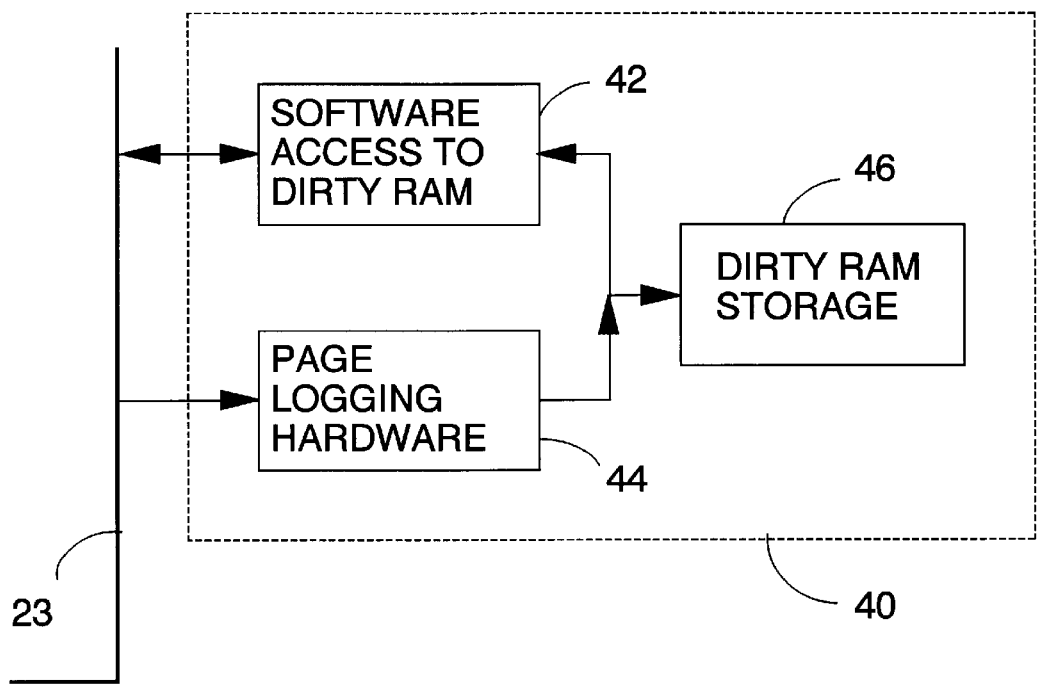
FIG. 4 is a schematic representation of a memory management unit.

FIG. 4 shows a conventional memory management unit 40 which has been customised to include only information on which pages of memory are dirty and which are clean. In the following description this type of memory management unit is termed a 'dirty ram'. Software 42 may access the dirty ram storage 46 to check which pages are dirty, and can write it directly to change the status of a page to dirty or clean. In addition, hardware 44 automatically changes to 'dirty' the state of the record for any page of main memory which is written to via the bus 23. In this embodiment only one bit of dirty ram storage 46 is used for each entire page of main memory. It is not necessary that the size of the 'pages' monitored by the dirty ram is the same as the size used by other memory management units in the system, but it is often both convenient and efficient that the pages all have the same size. Computers tend to work in pages and a write access to one part of a page often implies that other locations within the same page will also be written. However, a conventional memory management unit as shown in FIG. 3 will not in itself be sufficient to implement the task in hand because most of the pages are usually dirty as described above.

Figure 5:
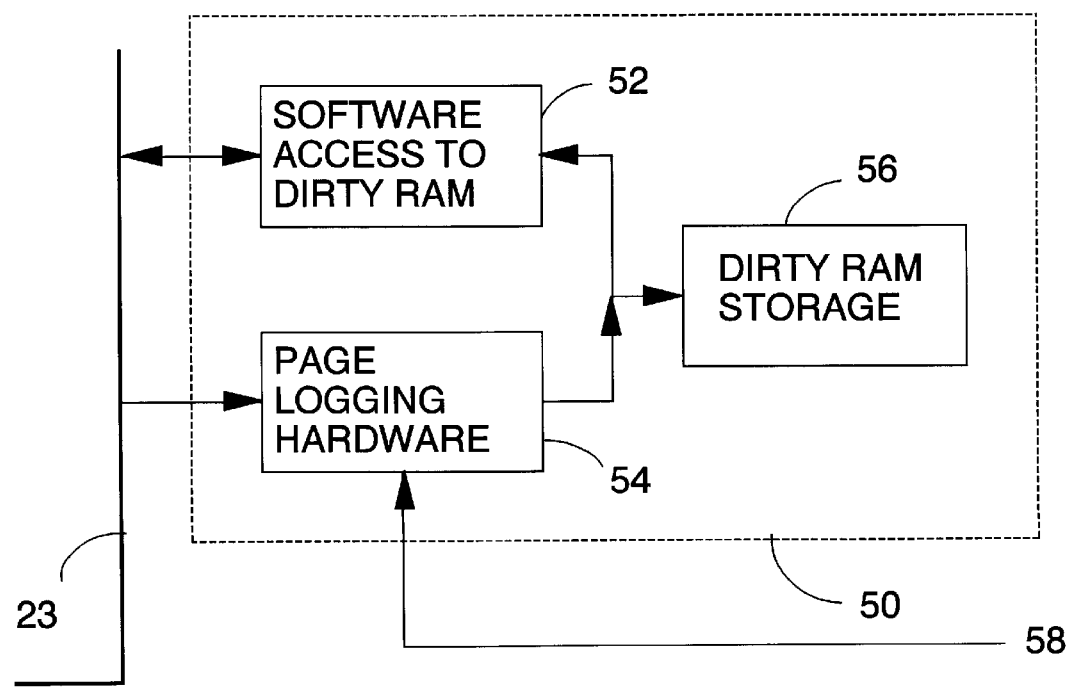
FIG. 5 is a schematic representation of an example of a first recording mechanism.

FIG. 5 is a schematic block diagram of a dirty ram 50 for a first embodiment of the invention. In FIG. 5, the dirty ram 50 is provided with a separate enable input 58 whereby the hardware 54 only begins to log dirty pages in the dirty ram storage 56 after the processing sets have gone out of sync. The signal on the enable input is asserted in response to the detection by the voter 17 of an out-of-sync event.

The dirty ram enable input 58 allows the operation of the dirty ram system. In normal operation, with processing sets running in sync, the dirty ram enable input is not asserted and the dirty ram 50 is set by the software 52 such that all pages are given 'clean' status.

When an out-of-sync event occurs, the enable input 58 becomes asserted. While the enable input is asserted (i.e., while the processing sets are out of sync), the dirty ram logs the pages of main memory written to. The pages which are written to will be those which potentially differ on the running and the out-of-sync processing sets. A dirty ram with an enable input as in FIG. 5 is provided in each processing set and is connected there to the respective system bus 23. While the processing sets are running in sync, each dirty ram is held in the clean state by the software 52. When it is detected that the processing sets are running out of sync the dirty ram logging is enabled. In this embodiment, a hardware enable signal 58 is generated in the out-of-sync detection hardware (i.e., the voter 17) on detecting that the processing sets 10, 11, 12 are out-of-sync. In other words, whenever the voter detects a difference in the output from the processing sets, it generates a signal which is supplied to each processing set to form the asserted out-of-sync signal. Once asserted, the out-of-sync signal is not negated until the processing sets have been reinstated. In other embodiments, the enable signal could be generated by software.

After an out-of-sync event, software and/or hardware mechanisms act to reconfigure the fault tolerant computer system. The system carries on running normal operations with at least one processing set. At least one processing set, including the out-of-sync processing set is taken out of operation. This out-of-sync processing set thereby stops running normal operations and waits to be reintegrated into the running system. Memory writes done on the running and the out-of-sync processing set produce divergence in the main memory contents in the running and out-of-sync processing sets.

When software on the running system comes to reintegrate the out-of-sync processing set, it accesses the dirty ram on the running system to find pages of memory that have been dirtied since the out-of-sync event. It also accesses the dirty ram in the out-of-sync processing set. This dirty ram tells which pages have been modified by the out-of-sync processor(s) since the divergence began. If a page of memory is mentioned as dirty in any of the dirty rams, on the running and out-of-sync processing sets, it has to be copied by the reintegration software to bring the out-of-sync processing sets back into sync. If a page of memory is not marked as dirty in any dirty ram, it can be ignored, as it will still be correct on the out-of-sync processing set.

In an alternative embodiment of the invention, if the processing sets have a dirty ram store with no enable pin, operating all the time to log dirty pages, software could be activated by a hardware signal on the out-of-sync event to clean out the dirty ram. This software must carefully note any pages which it itself dirties during the cleaning process.

In yet another alternative embodiment, an ordinary memory management unit can also be used to collect the dirty page information. In this alternative embodiment, software is arranged to modify the page tables at the out-of-sync event so that all pages of main memory are write protected. This means that write cycles to memory will result in a bus error exception to the processor. The processor can then act on each bus error first to add the written page to a software-maintained list of dirty pages, then to remove the write protection for that page so that future writes there will complete normally. This has the advantage that only a single list of dirty pages need be examined by the reintegration software, with no searching through clean pages to look for occasional dirty ones.

It should be noted, however, that it is desirable to provide a separate 'dirty memory' rather than to use using conventional memory management units with additional software to collect dirty page information. This is because the use of conventional memory management units suffers from twin disadvantages. Firstly, the conventional computer operating system software may be using the memory management unit for its own purposes. Secondly, conventional memory management units work for only a single processor and cannot cover multi-processor operation or direct memory access by I/O devices.

Whatever method is used to collect the data on dirty memory pages, there are likely to be problems near the out-of-sync event. Some time has to elapse between the detection of the out-of-sync event and the enabling of the dirty ram data collection, and a few dirty pages may go unrecorded in this period. Exactly how many pages are missed depends on the implementation of the dirty ram, but even a single missed page is enough to make useless the scheme of copying only some, not all, of main memory after an out-of-sync event.

Accordingly, in embodiments of the invention, a mechanism is also provided for recording memory write events around the out-of-sync event.

The mechanisms described above for providing a record of dirty pages are put into operation starting at the out-of-sync event, and can record all the pages required following that event. However, to complement this a separate, temporary, record is required for pages dirtied close to the out-of-sync event. This separate record has to take account of write events over a limited time, preferably on a rolling basis. This separate record needs to have a capacity sufficient to accommodate write events which might occur between the out-of sync event itself and the time the mechanisms described above can start recording. This separate record is called the secondary dirty page record in the following description, to distinguish it from the 'dirty ram' already discussed above.

The secondary dirty page record has to be operating continually (at least until an out-of-sync event occurs), because it cannot be predicted when a fault will send it out-of-sync. It is the job of the secondary dirty page record to remember those pages, dirtied just before or after an out-of-sync event, that may not be properly collected by the dirty ram. The secondary dirty page record also has to have limited time memory. If it remembered pages dirtied indefinitely far in the past, it would eventually list all memory pages as being dirty. It should only remember far enough back past the out-of-sync event to ensure that divergently dirtied pages which the primary dirty page store cannot catch are included.

In some embodiments described below, where the secondary dirty page record operates in parallel with the dirty ram, the secondary page record is frozen at or soon after the out-of-sync event. In these embodiments, if it were left running, the limited-time nature of the record could eventually allow the important information about the out-of sync event to be overwritten or lost. This can conveniently be done by responding to the asserting of the dirty ram enable signal to inhibit the operation of the secondary page record.

Once the secondary dirty page record has been frozen, either software or hardware can examine it and cause dirty pages listed there to be added to the primary dirty ram, or to a separate list for copying by the reintegration software. Both out-of-sync and running processing sets have secondary dirty page records. Software can examine and compare the records and deduce which pages were actually dirtied in sync by the processing sets, if needed. This will decrease the number of pages to be copied.

Figure 6:
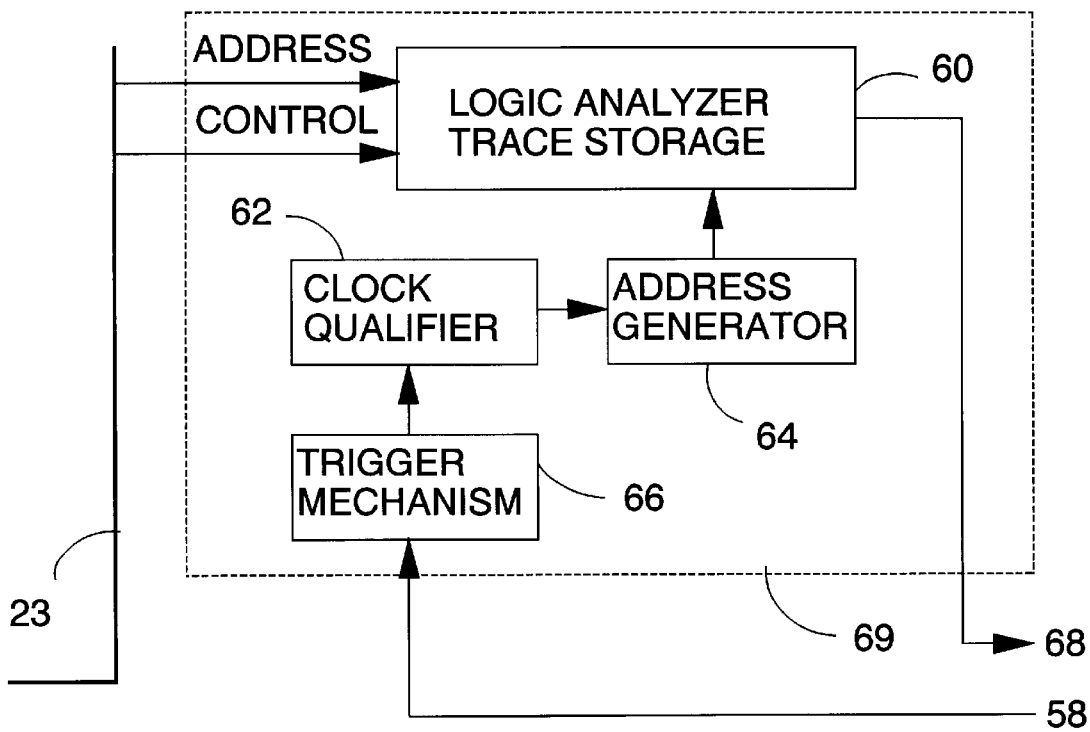
FIG. 6 is a schematic representation of an example of a secondary recording mechanism.

In one embodiment a logic analyzer is used to collect information for the secondary dirty page record. FIG. 6 shows a logic analyzer 60 observing the bus 23 of a processing set. A logic analyzer 60 with a trigger mechanism 66, clock qualifier 62 and address generator 64, is provided for each processing set. The logic analyzer is usually running. The analyzer 60 is triggered causing data collection to stop, by the assertion of the processing set out-of-sync signal, which same signal starts the primary dirty ram collecting data. The logic analyzer eventually stops operating and keeps a record of computer bus operation both before and after the out-of-sync event. By analysing the logic analyzer traces from the out-of-sync and running processing sets after an out-of-sync event, it is possible to deduce which of the stored transactions is a divergent write cycle. The relevant pages can then be added to a set of pages written to in a software-maintained secondary dirty page record. The logic analyzer needs to store at least the address and control information for each bus cycle so that pages written to can be determined. The analysis of the logic analyzer outputs can readily be effected by software routines.

The advantage of using a logic analyzer for the secondary dirty page record is that lockstep fault tolerant computers will typically have logic analyzers built in, and triggered on the out-of-sync event, for fault diagnosis. It is then merely necessary to provide the software to control and analyze the output of the logic analyzers as described above.

Figure 7:
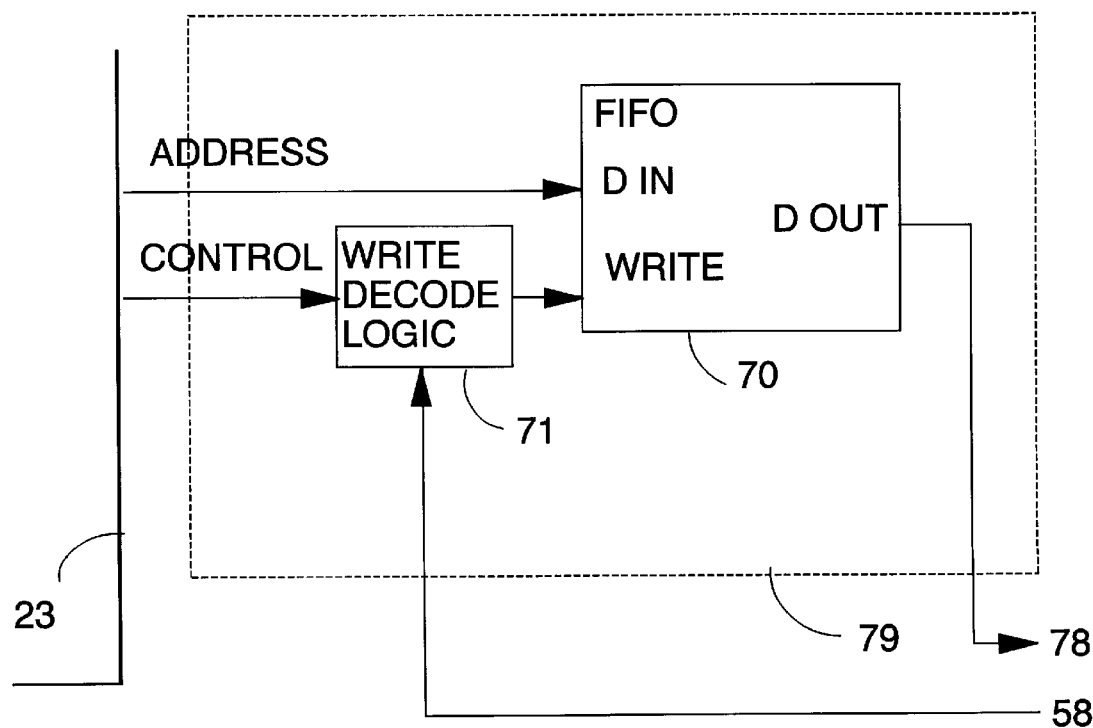
FIG. 7 is a schematic representation of another example of a secondary recording mechanism.

As an alternative, a write buffer can provide storage for the secondary dirty page record. FIG. 7 shows a first-in-first-out memory 70 used as a short-term buffer for writes to main memory over the internal bus 23. In normal in-sync operation, writes to main memory are decoded by write decode logic 71 and the page number of each write is written into the FIFO 70. When the out-of-sync occurs, the hardware out-of-sync detection signal 58 inhibits further writes into the FIFO 70. Later, software can examine the FIFO 70 contents to add pages to the dirty page list. The advantage of the write buffer for a secondary dirty page record is that it is simpler in both software and hardware than a logic analyzer.

In further alternatives, the write buffer can be arranged in series with the dirty ram.

Figure 8:
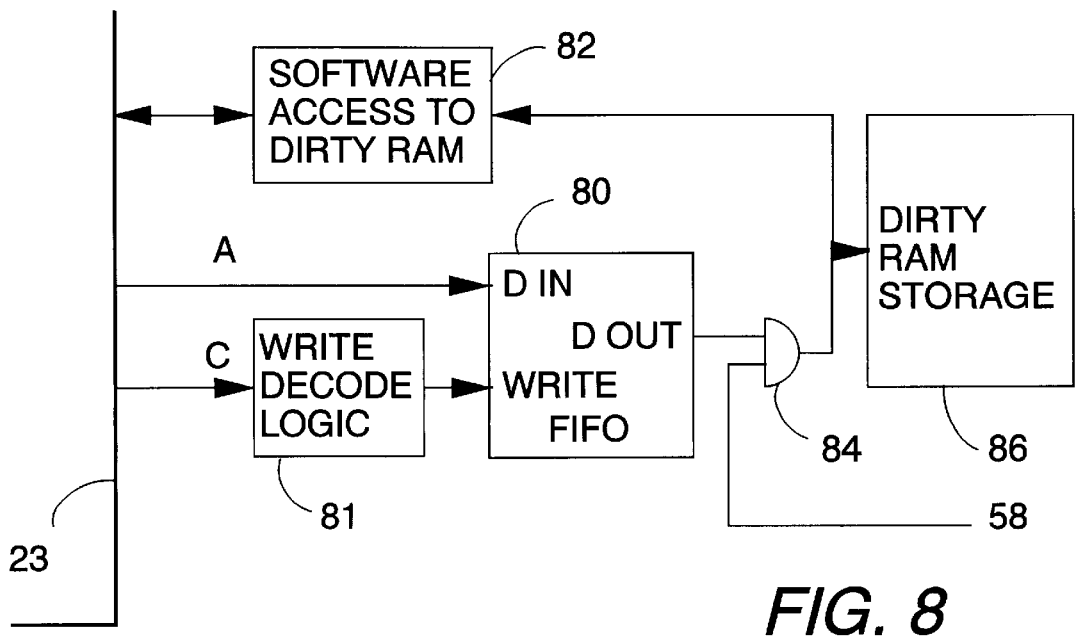
FIG. 8 is a schematic representation of an example of a combined first and secondary recording mechanism.

FIG. 8 illustrates a first example of a combination of a first and secondary recording mechanism, where a write buffer is arranged in series with a dirty ram. The arrangement of FIG. 8 is based on a combination of the arrangements of FIGS. 4 and 7. In this case, a FIFO buffer 80 is operating continually to record write events to memory for a processing set with the write events being decoded continually by the write decode logic 81 to supply page addresses for storage in the FIFO 80. In the present case it is not necessary for the write decode logic to receive an inhibit input as will be described later. Page addresses supplied to the FIFO 80 appear, after a delay, at the output of the FIFO 80. However, they are prevented from being passed to the dirty ram storage 86 by means of the gate 84 until the gate is enabled by an out-of-sync signal on the line 58. This out-of sync signal effectively provides an enable signal for the dirty ram as it then enables the page addresses from the FIFO 80 to be supplied to the dirty ram storage 86, whereby appropriate page bits can be set. Software 82 can be used to clear the dirty ram storage 86 at any time prior to an out-of-sync event so that it is 'clean' when the out-of-sync signal is supplied.

In this embodiment, it is not necessary to disable the FIFO buffer 80, as the contents of the FIFO buffer 80 are automatically stored in the dirty ram after a time dependent on the size of the FIFO 80 and the frequency of the write events. In this embodiment the reintegration mechanism preferably takes account of the dirty ram 86 and the FIFO 80.

Figure 9:
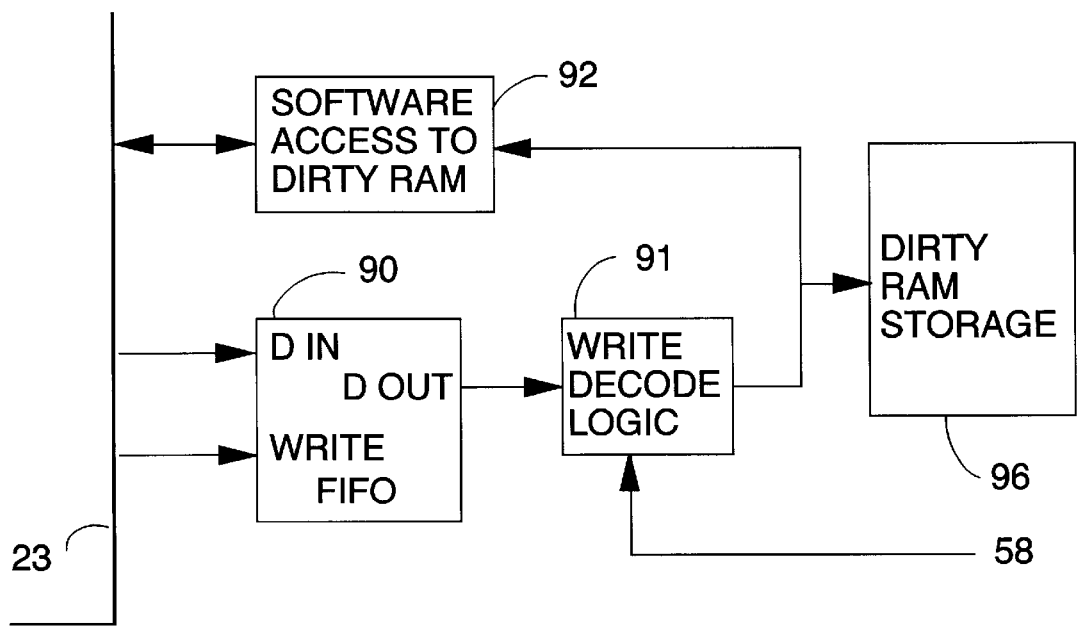
FIG. 9 is a schematic representation of an alternative configuration of the example of FIG. 8.

FIG. 9 illustrates a second example of a combination of a first and secondary recording mechanism, where a write buffer is arranged in series with a dirty ram. In this example, a FIFO buffer 90 is operating continually to record write events to memory for a processing set. The output from the FIFO buffer 90 is supplied to an address decoder 91 which is only enabled in response to the out-of-sync enable signal 58. When the address decoder 91 is not enabled, the output of the FIFO buffer is effectively discarded. Only when the address decoder is enabled are dirty page bits output from the address decoder 91 for storage in the appropriate page location in the dirty ram storage 96.

Optionally, the out-of-sync enable signal is also supplied to the dirty ram itself, although it will be appreciated that supplying the out-of-sync signal to the address decoder effectively provides an enable signal for the dirty ram. As for the FIG. 8 example, in this embodiment it is not necessary to disable the FIFO buffer 90, as the contents of the FIFO buffer 90 are automatically stored in the dirty ram after a time dependent on the size of the FIFO 90 and the frequency of the write events. In this embodiment the reintegration mechanism preferably takes account of the dirty ram 96 and the FIFO 90.

A further, software-implemented embodiment makes use of a table look-aside buffer (TLB) and an associated TLB miss routine, plus a dirty page store which is created in main memory. A TLB forms a standard part of most computer addressing schemes using paged memory. Some computers maintain TLB entries with a software TLB miss routine, instead of fixed hardware. In this embodiment, and following a fault event, software can note the TLB entries currently specifying writable pages, and add those to the soft dirty page store. Software can also transfer to this a list of writable pages recently flushed from the TLB. This list is maintained by the miss routine in normal circumstances, before the fault event, and indicates pages which might have been written close to the fault event and immediately flushed from the TLB. Following this, while reintegration is in progress, software in the TLB miss routine adds each page written to the soft dirty page store. In this way, a record of dirty pages can be created.

The approaches described above can be applied in a triple-modular-redundant (TMR) system. Some TMR lockstep systems switch to running with a single processing set when an out-of-sync event occurs. This requires two separate reintegration phases to recover.

An example will be described where a TMR system is running with processing sets 10, 11 and 12 in sync. In this example, reintegration is performed by software under the control of a control computer forming part of the voter 17.

For this example, it is assumed here that processing set 12 suffers a dram soft error which takes the system out of sync. The voter detects the out-of-sync event and arbitrarily chooses processing set 10 to carry on and idles processing sets 11 and 12. Each of processing sets 10, 11 and 12 has its own primary dirty ram and secondary dirty page record, all capturing the differentially dirtied data since the out-of-sync event.

To reintegrate processing set 11, all of the pages mentioned as dirty in processing set 10 dirty ram, processing set 10 secondary dirty page record, processing set 11 dirty ram and processing set 11 secondary dirty page record are copied from processing set 10 to processing set 11.

Then, to reintegrate processing set 12, all the pages mentioned as dirty in processing set 10 dirty ram, processing set 10 secondary dirty page record, processing set 12 dirty ram and processing set 12 secondary dirty page record are copied from processing set 10 to processing set 12.

During the reintegration of processing set 11, the processing set 10 has to continue to record the dirtying of pages. If the processing set 10 dirty page ram is inoperative during some part of this process, software must maintain a separate list of pages being dirtied to add to the list of pages copied to processing set 12.

There has been described, therefore, embodiments of the invention in which there are provided: a primary dirty ram, for example a dedicated memory management unit or a conventional memory management unit with control mechanisms; a secondary dirty page record which records a limited number of write events to memory around the out-of-sync event, sufficient to capture all divergent writes until the primary dirty ram is enabled; and a mechanism, either hardware or software, to start the primary dirty ram recording the dirtying of pages shortly after an out-of-sync event, and where appropriate to stop the secondary dirty page record. By examining the primary dirty ram and secondary dirty page record of two processing sets and copying the pages of memory mentioned as dirty in any dirty page record to the out-of-sync processing set the system can be reinstated in an efficient manner.

Although particular embodiments of the invention have been described herein, it will be appreciated that many modifications and/or additions may be made within the spirit and scope of the present invention.

For example, various combinations of the first and second recording mechanisms described above may be provided. Also the various elements and techniques described above may be implemented using any appropriate hardware or software technology.

Although a specific example of a TMR system has been described, the invention is not limited thereto. Moreover, other methods than majority voting can be used to identify an out-of-sync processing set.

Although particular embodiments of the inventions have been described, it will be appreciated that the invention is not limited thereto, and many modifications and/or additions may be made within the spirit and scope of the invention as defined in the appended Claims. For example, different combinations of the features of the dependent Claims may be combined with the features of the independent Claims.

What I claim is:

1. A memory management system for a fault tolerant computer system, said memory management system comprising:
   a first recording mechanism which can be activated to record memory update events;
   a fault input for a fault signal to activate said first recording mechanism in the event of a fault event;
   a second recording mechanism having a capacity to record at least a limited number of memory update events, and to maintain a record of recent memory update events up to a number sufficient to cover the time to activate said first recording mechanism following said fault event, said second recording mechanism comprises a first-in-first-out buffer, an output of said first-in-first-out buffer is connected to said first recording mechanism, and further said first-in-first-out buffer stores up to a predetermined number of update addresses, an address decoder is connected to said output of said first-in-first-out buffer to generate a page signal representative of a memory update address output from said first-in-first-out buffer and said address decoder is responsive to said fault signal to pass said page signal to said first recording mechanism; and
   a memory reintegration mechanism to reintegrate at least parts of memory identified in said first and second recording mechanisms.

2. A memory management system according to claim 1, wherein said first recording mechanism is a memory management unit comprising storage having an entry for each of a plurality of memory pages, a code being written to a page entry each time that page is written to when said first recording mechanism has been activated.

3. A memory management system according to claim 2, wherein said first recording mechanism has an enable input connected to receive the fault signal for activating said first recording mechanism.

4. A memory management system according to claim 1, wherein said second recording mechanism comprises a logic analyzer.

5. A memory management system according to claim 1, wherein said second recording mechanism maintains a record of recent memory update events up to a number sufficient to cover the time to activate said first recording mechanism following a fault event, the operation of said second recording means being inhibited in response to said fault signal.

6. A memory management system according to claim 5, wherein said first recording mechanism comprises a software generated list of update events.

7. A memory management system according to claim 1, wherein said second recording mechanism comprises a table look-aside buffer and a memory access table maintained in main memory.

8. A memory management system according to claim 1, wherein said memory reintegration mechanism is operative to reintegrate memory pages identified in said first and second recording mechanisms.

9. A fault tolerant computer system comprising a plurality of synchronous processing sets, each including a processor and internal memory and operating in lockstep, and an out-of-sync detector for detecting an out-of-sync event and for generating an out-of-sync signal, wherein each processing set includes:
   a first recording mechanism which can be activated to record memory update events;
   a fault input for a fault signal to activate said first recording mechanism in the event of a fault event;
   a second recording mechanism having a capacity to record at least a limited number of memory update events, and to maintain a record of recent memory update events up to a number sufficient to cover the time to activate said first recording mechanism following said fault event, said second recording mechanism comprises a first-in-first-out buffer, an output of said first-in-first-out buffer is connected to said first recording mechanism, and further said first-in-first-out buffer stores up to a predetermined number of update addresses, an address decoder is connected to said output of said first-in-first-out buffer to generate a page signal representative of a memory update address output from said first-in-first-out buffer and said address decoder is responsive to said fault signal to pass said page signal to said first recording mechanism; and
   a memory reintegration mechanism to reintegrate at least parts of memory identified in said first and second recording mechanisms.

10. A fault tolerant computer system comprising a plurality of synchronous processing sets, each comprising a processor and internal memory and operating in lockstep, and an out-of-sync detector for detecting an out-of-sync event and for generating an out-of-sync signal, wherein each processing set also comprises:
    a first recording mechanism which can be activated to record memory write events;
    a fault input for receiving said out-of-sync signal to activate said first recording mechanism in the event of said out-of-sync event;
    a second recording mechanism having a capacity to record at least a limited number of memory write events, and to maintain a record of recent memory update events up to a number sufficient to cover the time to activate said first recording mechanism following said out-of-sync event, said second recording mechanism comprises a first-in-first-out buffer, an output of said first-in-first-out buffer is connected to said first recording mechanism, and a further said first-in-first-out buffer stores up to a predetermined number of update addresses, an address decoder is connected to said output of said first-in-first out buffer to generate a page signal representative of a memory update address output from said first-in-first-out buffer and said address decoder is responsive to said out-of-sync signal to pass said page signal to said first recording mechanism; and
    a memory reintegration mechanism to reintegrate in an out-of-sync processing set at least parts of memory identified in said first and second recording mechanisms.

11. A fault tolerant computer system according to claim 10, wherein said first recording mechanism is a memory management unit comprising a RAM with an entry for each of a plurality of memory pages, a code being written to a page entry each time that page is written to when said first recording mechanism has been activated.

12. A fault tolerant computer system according to claim 11, wherein said first recording mechanism has an enable input connected to receive the out-of-sync signal for activating said first recording mechanism.

13. A fault tolerant computer system according to claim 10, wherein said second recording mechanism comprises a logic analyzer.

14. A fault tolerant computer system according to claim 10, wherein said second recording mechanism maintains a record of recent memory update events up to a number sufficient to cover the time to activate said first recording mechanism following the out-of-sync event, the operation of said second recording means being inhibited in response to said out-of-sync signal.

15. A fault tolerant computer system according to claim 14, wherein said first recording mechanism comprises a software generated list of update events.

16. A fault tolerant computer system according to claim 10, wherein said second recording mechanism comprises a table look-aside buffer and a memory access table maintained in main memory.

17. A fault tolerant computer system according to claim 10, wherein said memory reintegration mechanism is operative to reintegrate memory pages identified in said first and second recording mechanisms.

18. A fault tolerant computer system according to claim 10, comprising three synchronous processing sets operating in lockstep, wherein said out-of-sync detector determines an out-of-sync processing set by majority voting.

19. A fault tolerant computer system according to claim 18, wherein said out-of-sync detector is arranged to select one of the remaining two processing sets, to supply an input to the out-of-sync processing set and the remaining processing set to cause said out-of-sync and remaining processing sets to idle, to reintegrate one of said out-of-sync and remaining processing sets while maintaining a software log of memory write events, and then to reintegrate said other of said out-of-sync and remaining processing sets using said software log.

20. A method for reintegration of a processing set of a fault tolerant computer system comprising a plurality of synchronous processing sets, each comprising a processor and internal memory and operating in lockstep, and a fault detector for detecting a fault event and for generating a fault signal, said method comprising:

maintaining a temporary record of memory update events over a limited period, said temporary record being stored in a first-in-first-out buffer;

connecting a recording mechanism for recording an output of said first-in-first-out buffer;

responding to said fault signal to activate a further record of memory update events following said fault signal;

maintaining a record of recent memory update events up to a number sufficient to cover the time to activate said further record;

storing up to a predetermined number of update addresses in said first-in-first-out buffer, supplying the output of said first-in-first out buffer to an address decoder to generate a page signal representative of a memory update address output from said first-in-first-out buffer, and recording said page signal as part of said further record when said fault signal is active; and performing memory reintegration in a processor in which a fault has occurred for at least those parts of memory identified in said temporary and further memory records.

21. A method according to claim 20, wherein said fault event is an out-of-sync event.

22. A method according to claim 20, wherein the further record is stored in a storage of a memory management unit, a page entry in said storage being provided for each page of memory, a code being written to a page entry each time that page is written to when said recording mechanism has been activated.

23. A method according to claim 20, wherein said temporary record is stored in a logic analyzer.

24. A method according to claim 20, comprising the steps of maintaining said temporary record of recent memory update events up to a number sufficient to cover the time to activate said first recording mechanism following a fault, said temporary record being inhibited in response to said fault signal.

25. A method according to claim 24, comprising generating a list of update events by software.

26. A method according to claim 20, comprising forming said temporary record using a table look-aside buffer and a memory access table maintained in main memory.

27. A method according to claim 20, comprising the step of reintegrating memory pages identified in said temporary and further records.

28. A method according to claim 20, comprising three synchronous processing sets operating in lockstep, wherein an out-of-sync detector determines an out-of-sync processing set by majority voting.

29. A method according to claim 20, comprising the steps of, in response to the identification of an out-of-sync processing set, selecting one of the remaining two processing sets, supplying an interrupt to the out-of-sync processing set and the remaining processing set to cause said out-of-sync and remaining processing sets to idle, reintegrating one of said out-of-sync and remaining processing sets while maintaining a software log of memory write events, and then reintegrating said other of said out-of-sync and remaining processing sets using said software log.

30. A memory management system for a fault tolerant computer system, said memory management system comprising:

a first recording mechanism which can be activated to record memory update events;

a fault input for a fault signal to activate said first recording mechanism in the event of a fault event;

a second recording mechanism having a capacity to record at least a limited number of memory update events, and to maintain a record of recent memory update events up to a number sufficient to cover the time to activate said first recording mechanism following said fault event; and a memory reintegration mechanism to reintegrate at least parts of memory identified in said first and second recording mechanisms, wherein said memory reintegration mechanism is operative to reintegrate memory pages identified in said first and second recording mechanisms.

31. A fault tolerant computer system having a plurality of synchronous processing sets, each including a processor and internal memory and operating in lockstep, and an out-ofsync detector for detecting an out-of-sync event and for generating an out-of-sync signal, wherein each processing set includes a memory management system, said memory management system comprising:

a first recording mechanism which can be activated to record memory update events;

a fault input for a fault signal to activate said first recording mechanism in the event of a fault event;

a second recording mechanism having a capacity to record at least a limited number of memory update events, and to maintain a record of recent memory update events up to a number sufficient to cover the time to activate said first recording mechanism following said fault event; and a memory reintegration mechanism to reintegrate at least parts of memory identified in said first and second recording mechanisms, wherein said memory reintegration mechanism is operative to reintegrate memory pages identified in said first and second recording mechanisms.

32. A fault tolerant computer system comprising a plurality of synchronous processing sets, each comprising a processor and internal memory and operating in lockstep, and an out-of-sync detector for detecting an out-of-sync event and for generating an out-of-sync signal, wherein each processing set also comprises:

a first recording mechanism which can be activated to record memory write events;

a fault input for receiving said out-of-sync signal to activate said first recording mechanism in the event of said out-of-sync event;

a second recording mechanism having a capacity to record at least a limited number of memory write events, and to maintain a record of recent memory update events up to a number sufficient to cover the time to activate said first recording mechanism following said out-of-sync event, and a memory reintegration mechanism to reintegrate in an out-of-sync processing set at least parts of memory identified in said first and second recording mechanisms, wherein said memory reintegration mechanism is operative to reintegrate memory pages identified in said first and second recording mechanisms.

33. A method for reintegration of a processing set of a fault tolerant computer system including a plurality of synchronous processing sets, each having a processor and internal memory and operating in lockstep, and a fault detector for detecting a fault event and for generating a fault signal, said method comprising:

maintaining a temporary record of memory update events over a limited period;

responding to said fault signal to activate a further record of memory update events following said fault state;

maintaining a record of recent memory update events up to a number sufficient to cover the time to activate said further record;

performing memory reintegration in a processor in which a fault has occurred for at least those parts of memory identified in said temporary and further memory records.

* * * * *